United States Patent
Hach

(10) Patent No.: US 8,263,918 B2
(45) Date of Patent: Sep. 11, 2012

(54) MICROWAVE PACKAGING

(75) Inventor: Maik Hach, Cape Girardeau, MO (US)

(73) Assignee: Nordenia USA Inc., Jackson, MO (US)

( * ) Notice: Subject to any disclaimer, the term of this patent is extended or adjusted under 35 U.S.C. 154(b) by 266 days.

(21) Appl. No.: 12/804,231

(22) Filed: Jul. 16, 2010

(65) Prior Publication Data

US 2012/0012578 A1   Jan. 19, 2012

(51) Int. Cl.
*H05B 6/80* (2006.01)
*B65D 81/34* (2006.01)

(52) U.S. Cl. ........ 219/730; 219/725; 219/727; 219/728; 219/729; 219/731; 219/732; 219/759; 229/242; 229/903; 426/107

(58) Field of Classification Search .................. 219/725, 219/727, 728, 729, 730, 731, 732, 759; 229/242, 229/903; 426/107
See application file for complete search history.

(56) References Cited

U.S. PATENT DOCUMENTS

| | | | |
|---|---|---|---|
| 4,927,991 A | 5/1990 | Wendt et al. | |
| 5,294,765 A * | 3/1994 | Archibald et al. | 219/727 |
| 6,259,079 B1 * | 7/2001 | Ji et al. | 219/727 |
| 6,765,182 B2 * | 7/2004 | Cole et al. | 219/730 |
| 7,019,271 B2 * | 3/2006 | Wnek et al. | 219/730 |
| 7,141,770 B2 | 11/2006 | Zafiroglu et al. | |
| 2008/0078759 A1 * | 4/2008 | Wnek et al. | 219/730 |

* cited by examiner

Primary Examiner — Dao H Nguyen
(74) Attorney, Agent, or Firm — Collard & Roe, P.C.

(57) ABSTRACT

A microwave packaging made of a flexible, heat-sealable laminate has a grid structure made of electrically non-conductive cells that do not absorb microwaves, and an electrically conductive metal grid that separates the cells from one another. The metal grid has a layer thickness of at least 1 μm, and the cells each have a size between 100 mm² and 1200 mm². The proportion of the non-conductive area formed by the cells amounts to at least 50% of the total area. A liquid-tight outer film follows a first side of the metal grid directly or by way of at least one connecting layer, and a moisture-absorbent layer follows a second side of the metal grid directly or by way of at least one intermediate layer, and has a polymer base substance and extends essentially over the entire area of the laminate. The microwave packaging is formed from the laminate by heat-sealing.

11 Claims, 3 Drawing Sheets

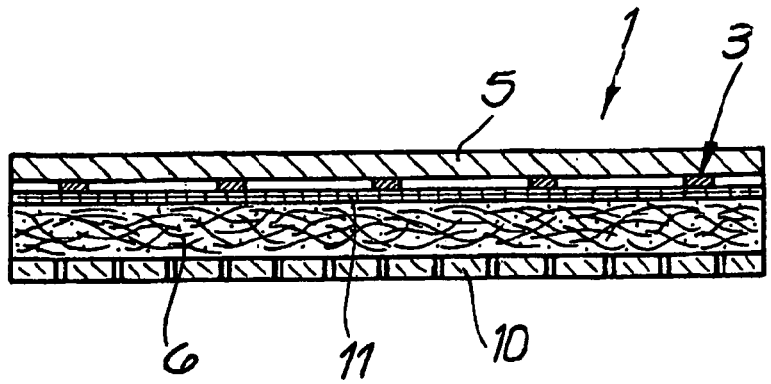
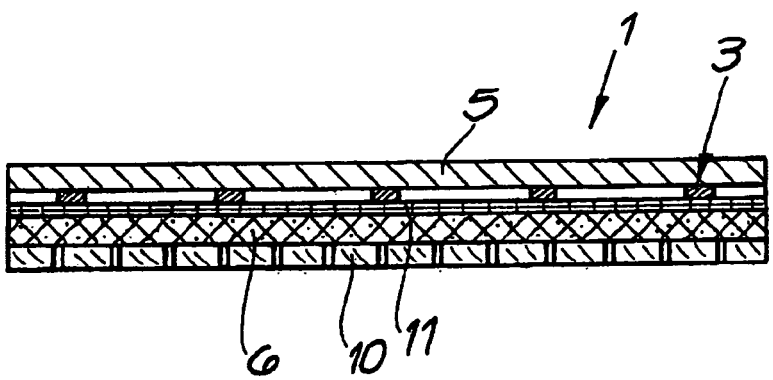
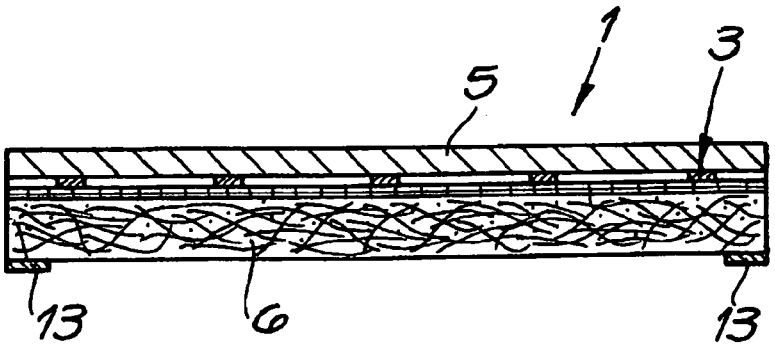
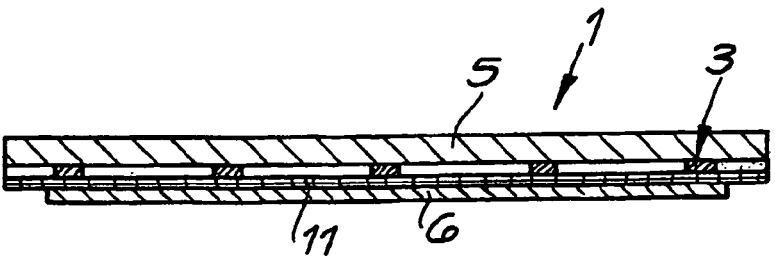

MICROWAVE PACKAGING

BACKGROUND OF THE INVENTION

1. Field of the Invention

The present invention relates to a microwave packaging, particularly to a microwave packaging made of a flexible, heat-sealable laminate. The packaging is intended to accommodate a food during storage and heating in a microwave. The microwave packaging can be provided both as a single sales packaging or in combination with a wrapper packaging.

2. The Prior Art

To prepare a heated food, the microwave packaging, together with the food contained in it, has microwave energy applied to it in a microwave oven. In this connection, heating is based on absorption of the microwaves by the moisture contained in the food and/or by an additional, energy-absorbing susceptor. Rapid heating of prepared foods is supposed to be made possible with the microwave packaging. Furthermore, the quality, the appearance, and the progression of the cooking process of the food during heating is supposed to be influenced by the type of packaging.

Microwave packagings are known from the state of the art, in the most varied embodiments. For example, U.S. Pat. No. 4,927,991 describes a microwave packaging having an energy-absorbing susceptor as well as a grid that controls the intensity of the microwaves. The susceptor heats up greatly as a result of absorption of the microwaves, so that the food, for example a prepared ready-to-eat pizza, is heated indirectly by way of the susceptor. Through the use of the susceptor, high temperatures in the range of typically 160° to 180° are reached, and regions of a food having different water content can be heated to the same extent, in advantageous manner. The use of susceptors has proven itself useful for preparing foods that are crispy and crunchy. Carry-over cooking and browning are also made possible by means of indirect heating using susceptors.

However, disadvantages of such active packaging are great production effort and high production costs. In particular, the material of the packaging must have a high temperature resistance because of the strong heating of the susceptor, thereby greatly restricting the selection. Accordingly, comparatively rigid, thick-walled materials are usually provided. Because of the indirect heating of the food, there are efficiency losses due to heat losses, and these lead to an increased heating period in comparison with direct heating. Finally, the food is also subjected to significant changes during heating, due to the high temperatures. For example, a strong moisture loss is usually connected with carry-over cooking, whereby steam that is formed can escape through openings or valves of the microwave packaging. Thus, there is the risk that the food, while it does become crispy and crunchy, also becomes unpleasantly dry.

Against this background, it can be advantageous if the food to be heated up is essentially already completely cooked, and is merely heated up in the microwave.

In the case of a simple microwave packaging that is entirely formed from a plastic film and does not have a susceptor, the food accommodated in the packaging is heated directly. When this happens, steam forms, which penetrates to the outside and condenses both on the inner surface of the packaging, which is still cold, because of the lack of additional heating, or on the outside of the food. This leads to the result that the inside of the food becomes tough and the outside of the food becomes mushy. When using simple microwave packagings that are only formed from a plastic film, very non-uniform heating of the food is also frequently observed.

U.S. Pat. No. 7,141,770 B2 describes a microwave packaging that has an absorbent insert underneath the food. The absorbent insert is intended to absorb liquid that drips off and thus regulates the moisture content within the packing to a certain extent. Since the insert covers only a small region of the surface underneath the food, condensation of liquid on the other inner surface of the packaging as well as on the outside of the packaging cannot be avoided. For example, moisture can also condense above the food and drip onto the food.

SUMMARY OF THE INVENTION

It is therefore an object of the invention to provide a simple, cost-advantageous microwave packaging that allows rapid heating without significant impairment of the quality of the food.

This object is accomplished by a microwave packaging made of a flexible, heat-sealable laminate, having a grid structure made of electrically non-conductive cells that do not absorb microwaves, and an electrically conductive metal grid that separates the cells from one another, the grid having a layer thickness of at least 1 µm. The cells each have a size between 100 mm² and 1200 mm², and the proportion of the non-conductive area formed by the cells amounts to at least 50% of the total area. There is a liquid-tight outer film that follows a first side of the metal grid directly or by way of at least one connecting layer. There is a moisture-absorbent layer that follows a second side of the metal grid directly or by way of at least one connecting layer, and has a polymer base substance and extends essentially over the entire area of the laminate. The microwave packaging is formed from a laminate by heat-sealing.

Thus, the invention relates to a microwave packaging in which direct heating of the food disposed in the package takes place by microwaves. Indirect heating with an additional susceptor is not provided. The electrically conductive metal grid provided according to the invention is configured with a layer thickness of 1 µm and a cell size between 100 mm² and 1200 mm², in such a manner that the microwaves are not or not significantly absorbed by the grid itself, and can penetrate into the packaging through the non-conductive cells, which do not absorb the microwaves, for direct heating of the food. The metal grid, which is preferably formed from aluminum, brings about uniform distribution of the microwave energy over the entire surface of the microwave packaging, so that uniform, direct heating of the food accommodated in the packaging is also achieved. The formation of particularly hot regions, in which a lot of steam is produced, and the formation of particularly cold regions, in which increased condensation is observed, are thereby counteracted.

Furthermore, the entire inner surface or almost the entire inner surface of the packaging has moisture-absorbent properties. Steam that has formed can be bound in this manner, and thereby the condensation on both the inside of the microwave packaging and on the outside of the food is clearly reduced. In this way, the outside of the food does not become mushy when it is heated.

According to the present invention, uniform properties are achieved over the surface of the heat-sealable laminate from which the microwave packaging is formed, with regard to both the penetration of microwaves into the packaging and the absorption of moisture, which properties lead to a particularly homogeneous and therefore also fast, direct heating of the food. Because of the uniform heating that results from the use of the metal grid, without a susceptor, the moisture loss can surprisingly be reduced by up to 40% or more. The residual moisture that occurs despite this is absorbed by the moisture-absorbent layer and thus cannot impair the food. As in the case of microwave packagings with a susceptor, heating can be achieved without the food losing its crispiness. With regard to the costs of the packaging and the water loss, however, there are significant advantages as compared with the state of the art. Because of the low water loss, the inside of the food stays juicy.

Another advantage of the present invention lies in that the microwave packaging, in contrast to microwave packagings with a susceptor, is heated less, as a whole. While a susceptor heats up to temperatures of typically 160° C. to 180° C., according to the present invention, heating by means of the formation of steam, in the direct heating of the food, is limited to a temperature range of about 100° C. Thus, cost-advantageous polymers that have lower heat shape retention can also be used for production of the microwave packaging. While packaging materials that demonstrate heat shape retention generally have great rigidity, usual polymers that are generally used for film packagings can be used within the scope of the invention. For example, polyesters and polyolefins are suitable for the layers of the laminate.

The flexible, heat-sealable laminate according to the invention consists, aside from the metal grid, of layers each having a polymer base substance. The invention thus relates to packagings that are free of layers of paper or paperboard. Thus, the film laminate can be processed similar to usual packaging films, and preferably has corresponding layer thicknesses and weights per area unit. The microwave packaging according to the invention can particularly be used in packaging and bag-shaping machines in which the laminate is drawn off a roll to form individual packaging units. Thus, the production of bags, particularly also of side-fold bags, is possible, among other things.

As explained above, aside from the greater freedom in the determination of the shape and of the material of the microwave packaging, there are also significant cost savings. For the formation of the microwave packaging, polyethylene terephthalate (PET) or biaxially oriented polypropylene (BOPP) can be used for the outer film or for another film layer. Furthermore, the outer film can also be co-extruded from a polymer or different polymers, in multiple layers, or laminated.

In order to be able to form the microwave packaging from the laminate by means of heat-sealing, the inner surface must be heat-sealable. Various embodiments are possible for this, within the scope of the invention. Thus, a heat-sealable layer can be provided on the inside of the packaging, which layer is itself moisture-absorbent. For example, the corresponding film layer can have absorbent additives such as super-absorbent polymers in a heat-sealable base material such as polyolefin, for example. In this connection, an open-pore structure of the moisture-absorbent film layer is advantageous, so that the moisture can easily penetrate into the layer. The possibility also exists of configuring the moisture-absorbent layer in a foamed manner, or to provide a multi-ply arrangement with multiple moisture-absorbent layers. According to the embodiment described, the absorbent layer extends over the entire area of the laminate. In the production of the microwave packaging, any desired cut-outs or shapes can thus be formed. However, the absorption amount for moisture is limited by mixing a moisture-absorbent material into a heat-sealable base substance, so that the packaging described is particularly suitable in the case of low or moderate formation of moisture during heating.

According to another embodiment of the invention, the laminate is heat-sealable only at certain sections of the inner surface. Thus, a moisture-absorbent material can be provided on the inside of the packaging, as a coating of a heat-sealable film, preferably a film of polyolefin, and individual regions in which the sealing seams of the packaging run can remain uncoated. The moisture-absorbent material extends over the entire or almost the entire surface of the laminate outside of the sealing seams, and thereby achieves a uniform appearance of the packaging and a high accommodation capacity. It is also possible to provide a layer of non-heat-sealable moisture-absorbent material on the inside, and then to cover this layer by an additionally applied heat-sealable material, for example a sealing varnish, only at the locations where the sealing seams run. The embodiments described, with an inner surface that is heat-sealable only at certain sections, have the disadvantage that a pattern repeat must be taken into consideration in the production of the packaging, when the flexible, heat-sealable laminate of an endless roll is being fed in.

According to another alternative embodiment of the invention, a heat-sealable layer of the laminate is disposed on the inside of the packaging, which layer allows the penetration of moisture and covers the moisture-absorbent layer disposed behind it. Within the scope of such an embodiment, the moisture-absorbent layer can also be formed from a powdered, fiber-form and/or grainy material. Contamination of the packaged food by the moisture-absorbent material is avoided by covering it with the heat-sealable layer on the inside. When a heat-sealable layer is provided on the inside of the packaging, this heat-sealable layer, just like the moisture-absorbent layer disposed behind it, usually extends over the entire area of the laminate, so that any desired cut-outs and shapes can be implemented within the scope of this embodiment, without taking any pattern repeat into consideration.

A heat-sealable inner layer that allows the penetration of steam can be implemented in different ways. Aside from an inner layer made of a heat-sealable nonwoven, which allows an effective exchange of moisture because of its open structure, perforated or foamed films having an open-pore structure, which are preferably formed from polyolefin, are also suitable.

The moisture-absorbent layer can be formed in that moisture-absorbent particles are introduced into a thermoplastic base substance during extrusion. Alternatively, the moisture-absorbent layer can also consist of a binder or adhesive matrix as well as moisture-absorbent particles distributed in the matrix. According to a particularly preferred embodiment of the invention, the moisture-absorbent layer is formed from nonwoven, and at least a portion of the fibers of the nonwoven is hydrophilic, and/or moisture-absorbent particles are embedded between the fibers.

The moisture-absorbent layer preferably has a moisture-absorbent material selected from the group of silica gel, calcium oxide, activated clay, and super-absorbent polymer or mixtures of at least two of these substances. Super-absorbent polymers that are known are polyarylate salts, carboxymethyl celluloses, and starch polymers, among others. In the case of a moisture-absorbent nonwoven, an increased accommodation capacity for moisture can also be achieved, additionally or alternatively, by means of a wetting agent that is mixed into the polymer when forming the nonwoven, or applied as a coating of the fibers. An embodiment in which the nonwoven is disposed, proceeding from the inside of the microwave packaging, behind a heat-sealable inner layer that permits the penetration of moisture. Moisture-absorbent particles that are disposed between the fibers of the nonwoven, are particularly preferred. The fibers of the nonwoven allow sufficient laminate adhesion with the adjacent layers, on the one hand, and make available a volume for the moisture-absorbent particles, on the other hand. The nonwoven is furthermore particularly open-pored and also allows significant expansion of the absorbent particles due to the absorption of moisture.

The metal grid that is provided according to the invention is configured in such a manner that the microwave energy is not or at least not significantly absorbed, but rather distributed uniformly. In order to avoid noteworthy absorption, the layer thickness is less than 1 μm. The metal grid can be vapor-deposited onto a carrier layer, for example the outer film or another film, or imprinted using a conductive printing ink. Alternatively, the metal grid can also be formed by punching, for which purpose a self-adhesive label with the grid, which is laminated onto the outer film, is made available.

The cells are usually rectangular, preferably square or essentially square.

Since the flexible, heat-sealable laminate for forming the microwave packaging can be processed similar to a conventional packaging film, the placement and formation of ventilation labels, weakening lines, and/or re-sealable closures is possible in a particularly simple manner. Profiles that engage into one another, for example, are known as re-sealable closures; these can optionally also be activated by means of a slide. In connection with the placement of additional devices such as ventilation labels or re-sealable closures, there is also the particular advantage that here, it is possible to use usual materials having a comparatively low temperature resistance. In particular, the heat-sealable laminate also allows attachment of such devices by means of heat-sealing.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIGS. 2 to 8 show alternative embodiments of the layer structure of a laminate from which the microwave packaging is formed.

DETAILED DESCRIPTION OF THE PREFERRED EMBODIMENT

Figure 1:
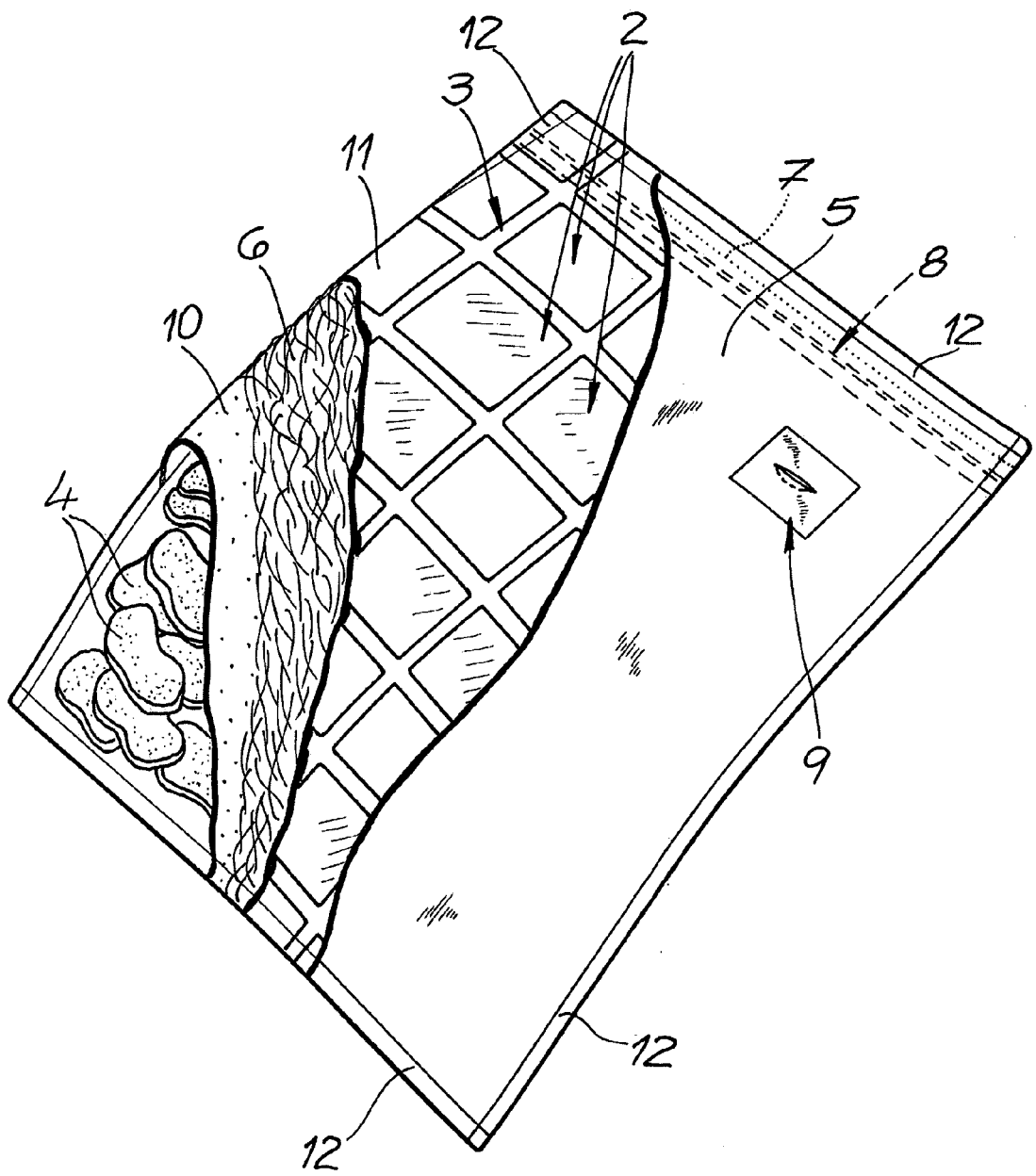
FIG. 1 shows a microwave packaging according to one embodiment of the invention in a partially broken-open representation.

Referring now in detail to the drawings, FIG. 1 shows a microwave packaging made from a flexible, heat-sealable laminate 1 that has a grid structure composed of electrically non-conductive cells 2 that do not absorb microwaves, and an electrically conductive metal grid 3 that separates cells 2 from one another. Microwaves can penetrate at free cells 2 in order to heat up a food 4 that is accommodated, chicken nuggets in the exemplary embodiment. Heating of food 4 therefore takes place directly. Metal grid 3 can be formed from aluminum, for example, and have a layer thickness of at least 1 μm. Metal grid 3 is provided for distributing the microwave energy uniformly over the entire area of laminate 1, in order to heat accommodated food 4 as uniformly as possible. In order for the microwaves to penetrate through the cells 2, these typically have a size between 100 mm$^2$ and 1200 mm$^2$, whereby the proportion of the non-conductive area formed by the cells 2 amounts to at least 50% of the entire area. Cells 2 usually have a rectangular, preferably a square shape.

According to the general structure of the laminate, a liquid-tight outer film 5 is provided on a first side of metal grid 3, which follows it directly or by way of at least one connecting layer. On a second side of metal grid 3, a moisture-absorbent layer 6, which has a polymer base substance and extends essentially over the entire, or as in the exemplary embodiment shown in concrete terms, over the entire area of laminate 1, follows it in the direction of the interior of the packaging, directly or by way of at least one intermediate layer.

The layer structure shown in concrete terms, as an example, in FIG. 1, corresponds to FIG. 2 explained below. Finally, in FIG. 1, additional devices that are optionally provided are also shown. Thus, for example, a weakening line 7 can be provided on one side of the packaging, which line allows easy opening of the microwave packaging. Weakening line 7 can be produced by means of a laser, for example. An edge section of the microwave packaging can be removed along weakening line 7, whereby a notch, not shown in the figure, can be provided at the edge of the microwave packaging for tear initiation. A re-sealable closure device 8 is indicated offset from weakening line 7, and can be formed from profile strips that can be locked into one another. As another optional device, a valve 9 applied as an adhesive label is shown in FIG. 1, whereby laminate 1 has a perforation in the form of a punched-out region underneath valve 9. By means of the valve 9, an overly high excess pressure as well as bursting of the microwave packaging can be reliably prevented when food 4 is heated microwaves.

The microwave packaging shown allows particularly uniform and gentle direct heating of the accommodated food 4. The microwave energy is uniformly distributed over the entire area of laminate 1 by metal grid 3, so that all the chicken nuggets accommodated in the microwave packaging are heated in the same manner. The formation of particularly hot and particularly cool locations is counteracted. In addition, the laminate has a moisture-absorbent layer 6 over its entire area, which layer is separated from foods 4 by a moisture-permeable inner layer 10, according to the concrete exemplary embodiment shown. Steam that forms during heating can reach the moisture-absorbent layer 6 through inner layer 10, which is perforated or has an open-celled, foamed structure, for example, and is bound there. Condensation of liquid on inner layer 10 or on the surface of food 4 is thereby prevented or at least reduced, so that food 4, which is configured as chicken nuggets in the exemplary embodiment, remains crispy-and crunchy.

According to the invention, efficient, direct, and uniform heating of food 4 takes place, with only a comparatively small amount of steam being formed during heating to a temperature planned for consumption. By reducing the moisture loss of the food 4, it remains nice and juicy on the inside, and crispy on the outside. Due to direct heating, particularly efficient utilization of the microwave energy radiated in also occurs, and thus particularly fast heating takes place. In contrast to microwave packagings with a susceptor, clearly lower temperatures are reached, so that it is possible to use usual polymers that are also used for production of conventional film packagings. Thus, outer film 5 preferably consists of polyethylene terephthalate or biaxially oriented polypropylene.

FIG. 2 shows the layer structure of laminate 1 of microwave packaging shown in FIG. 1. Metal grid 3 of aluminum is disposed between outer film 5 and a moisture-absorbent nonwoven as a moisture-absorbent layer 6. In the layer structure shown, an additional middle layer 11 made of a polyolefin film is also indicated between metal grid 3 and moisture-absorbent layer 6, but this is not absolutely necessary within the scope of the invention. Moisture-absorbent layer 6 is covered by a moisture-permeable inner layer 10 on the inside of the microwave packaging, and this layer can be configured, for example, as a perforated or open-celled, foamed polyolefin film. Inner layer 10 guarantees good heat-sealability and separates the moisture-absorbent layer 6 from the interior. The nonwoven used in the exemplary embodiment can have hydrophilic fibers and/or moisture-absorbent particles embedded between the fibers, for example. This results in the advantage that because of the use of a nonwoven and the separation of the interior by means of inner layer 10, even grainy, fibrous, or powdered moisture-absorbent particles can be used, which cannot reach food 4 because of the separation caused by inner layer 10. The lamination of laminate 1 is achieved through the use of the loose nonwoven within the scope of such an embodiment. There is also the advantage that the nonwoven is very open-pored and allows significant expansion during the absorption of moisture. It is practical if inner layer 10 is only partly laminated against moisture-absorbent layer 6.

FIG. 3 shows a modification of the layer structure shown in FIG. 2. Here, a moisture-absorbent adhesive is provided as a moisture-absorbent layer 6, in place of a moisture-absorbent nonwoven. The adhesive serves not only to absorb moisture, but also for a connection between middle layer 11 and inner layer 10. The absorption capacity for moisture is achieved by moisture-absorbent particles that are distributed in the adhesive matrix.

FIG. 4 shows an embodiment in which, in contrast to the variants described above, a moisture-absorbent layer 6 of nonwoven has direct contact with food 4. Only where sealing seams 12 are provided in FIG. 1 is a sealing varnish 13 provided, which allows heat-sealing. In contrast to the embodiment according to FIG. 2, it is necessary to prevent individual moisture-absorbent particles of the moisture-absorbent layer 6 from becoming loose and getting onto food 4, because of the direct contact.

FIG. 5 shows an embodiment in which metal grid 3, as described above, is disposed between an outer film 5 and a middle layer 11 made of polyolefin. Middle layer 11 is provided with a moisture-absorbent layer 6 in the direction of the interior of the microwave packaging, which layer is applied in the form of a coating and contains super-absorbent polymer. Moisture-absorbent layer 6 is left out in partial regions in which the production of sealing seams 12 is planned. Sealing seams 12 can be formed there by means of a direct connection of uncoated middle layer 11.

Figure 6:
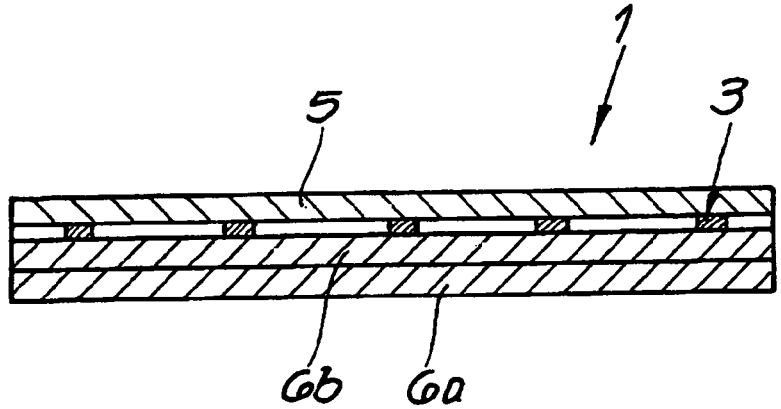
Figure 7:
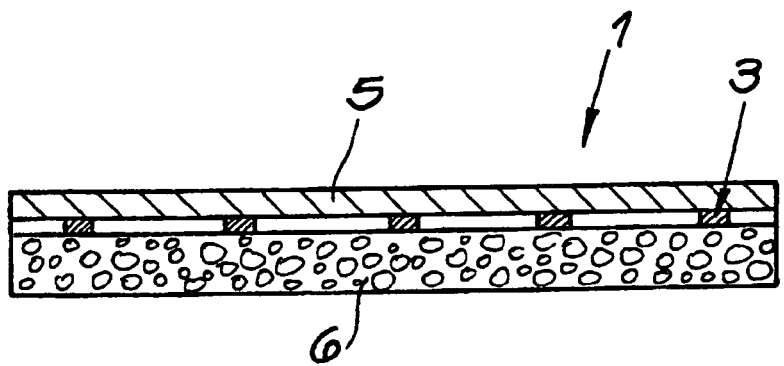

According to FIG. 6, two moisture-absorbent layers 6a, 6b are disposed one on top of the other, and moisture-absorbent layer 6a that is directed toward the inside of the microwave packaging is heat-sealable. Moisture-absorbent layers 6a, 6b can be formed, for example, from a polymer base substance on the basis of polyolefin, with super-absorbent polymers embedded in it. In order for sufficient moisture to be absorbed, an open-celled pore structure of moisture-absorbent layers 6a, 6b is preferably present. As indicated in FIG. 7, the entry of moisture can also be allowed by means of an open-celled, foamed configuration of the sealing film with super-absorbent polymers contained in it.

Figure 8:
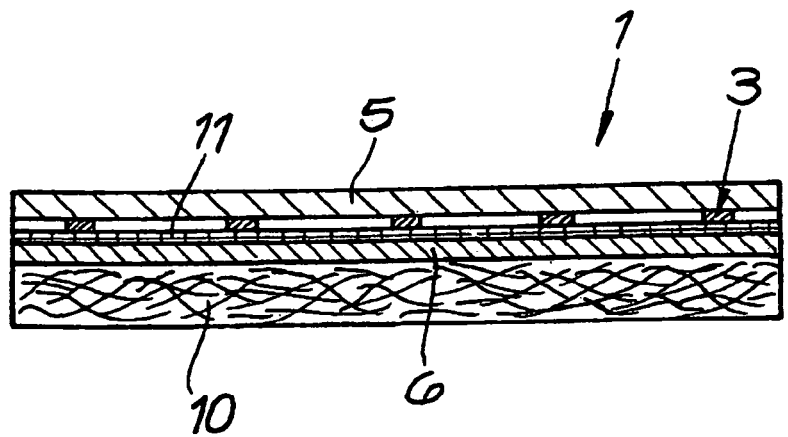

Finally, FIG. 8 shows a variant of the embodiment shown in FIG. 5, whereby a layer of nonwoven is provided as a moisture-permeable inner layer 10. Inner layer 10 itself is not configured to be moisture-absorbent according to this embodiment, and primarily serves to separate moisture-absorbent layer 6 from food 4.

Accordingly, while only a few embodiments of the present invention have been shown and described, it is obvious that many changes and modifications may be made thereunto without departing from the spirit and scope of the invention.

What is claimed is:

1. A microwave packaging made of a flexible, heat-sealable laminate, comprising:
   a grid structure made of electrically non-conductive cells that do not absorb microwaves, said cells each having a size between 100 mm$^2$ and 1200 mm$^2$;
   an electrically conductive metal grid that separates the cells from one another, said metal grid having a layer thickness of at least 1 µm, wherein a proportion of non-conductive area formed by the cells amounts to at least 50% of the total area of the packaging,
   a liquid-tight outer film directly adjacent a first side of the metal grid or separated from the metal grid by way of at least one connecting layer; and
   a moisture-absorbent layer directly adjacent a second side of the metal grid, or separated from the second side of the metal grid by at least one intermediate layer, said moisture-absorbent layer having a polymer base substance and extending essentially over an entire area of the laminate;
   wherein the microwave packaging is formed from the laminate by means of heat-sealing.

2. The microwave packaging according to claim 1, wherein the outer film consists of polyester or polyolefin.

3. The microwave packaging according to claim 2, wherein the outer film consists of polyethylene terephthalate (PET) or biaxially oriented polypropylene (BOPP).

4. The microwave packaging according to claim 1, wherein the moisture-absorbent layer is completely covered, on an inner surface of the packaging, with a heat-sealable inner layer that allows the passage of steam.

5. The microwave packaging according to claim 4, wherein the inner layer is formed by a heat-sealable nonwoven.

6. The microwave packaging according to claim 4, wherein the inner layer is formed by a perforated film made of polyolefin.

7. The microwave packaging according to claim 4, wherein the inner layer is formed from a foamed film of polyolefin, which has an open-pore structure.

8. The microwave packaging according to claim 1, further comprising an additional moisture-absorbent layer that is heat-sealable and forms an inner layer on an inner surface of the packaging.

9. The microwave packaging according to claim 1, wherein the moisture-absorbent layer is formed from a binder or adhesive matrix with moisture-absorbent particles distributed in the matrix.

10. The microwave packaging according to claim 1, wherein the moisture-absorbent layer is formed from nonwoven having fibers, and wherein at least a portion of the fibers of the nonwoven is hydrophilic, or moisture-absorbent particles are embedded between the fibers.

11. The microwave packaging according to claim 1, wherein the moisture-absorbent layer contains a moisture-absorbent material selected from the group consisting of silica gel, calcium oxide, activated clay, super-absorbent polymer, and mixtures thereof.

* * * * *